United States Patent [19]
Marchignoni

[11] 3,735,692
[45] May 29, 1973

[54] AUTOMATIC PIZZA MAKING MACHINE

[76] Inventor: Albano Marchignoni, Mura D'Azeglio 4, Bologna, Italy

[22] Filed: May 4, 1971

[21] Appl. No.: 140,056

[30] Foreign Application Priority Data
May 5, 1970 Italy..................................3438 A/70

[52] U.S. Cl...................99/353, 99/443 C, 99/450.1, 425/162, 425/168, 425/360
[51] Int. Cl.............................................A23p 1/00
[58] Field of Search.......................99/349, 369, 372, 99/385, 426, 450.1, 450.2, 450.3, 450.4, 450.5, 450.6, 450.7, 450.8, 353, 355, 443; 425/89, 95, 98, 100, 103, 150, 182-183, 195, 211, 217, 233-234, 235-236, 237-238, 409, 162, 168, 360

[56] References Cited
UNITED STATES PATENTS

| 835,756 | 11/1906 | Hutchison | 99/450.7 X |
| 2,774,316 | 12/1956 | Daino | 99/349 UX |
| 3,347,181 | 10/1967 | Pizzo | 99/450 X |
| 3,411,461 | 11/1968 | Gorth | 425/238 |

*Primary Examiner*—William I. Price
*Assistant Examiner*—Arthur O. Henderson
*Attorney*—Otto John Munz

[57] ABSTRACT

An automatic pizza making machine continuously intermittently dispensing a pizza dough mixture and pressing it into a disc onto a conveyor belt, with means to deposit different ingredients, spices and condiments at several stations along the path of the conveyor belt onto the pizza dough, and means to pass the conveyor through a baking oven.

10 Claims, 3 Drawing Figures

PATENTED MAY 29 1973  3,735,692

AUTOMATIC PIZZA MAKING MACHINE

FIELD OF THE INVENTION

Preparation of cakes, particularly pizza cakes, automatically by forming the dough mixture into suitable cake shapes, adding other ingredients, spices and condiments onto the pizza dough cakes and passing them through a baking oven.

DESCRIPTION OF THE PRIOR ART

Pizzas of the prior art are made usually by a manual method. The quality and uniformity of the pizzas therefore depends on the experience and skill of the chef.

SUMMARY OF THE INVENTION

The objects of this invention are a machine which automatically prepares pizzas of any predetermined sizes and shapes;

adds a predetermined variety and quantities of ingredients, spices and condiments;

bakes the pizzas in a predetermined heating and baking cycle to obtain a uniform and high quality of pizzas;

with a charging hopper for holding the pizza dough mixture;

with one or more processing lines with the necessary mechanical means to release sufficient dough mixtures to make one or more pizzas and to deposit the pizza dough into one or more pans mounted on one or more conveyor belts;

motor driven;

with one or more dispensing containers with dispensing devices, spaced and mounted over the conveyors, for spices and condiments, for flavoring the pizza dough mixture as it is carried along the conveyor processing lines;

with a baking oven through which the processing conveyor line passes to bake each pizza at a predetermined temperature for a certain time period;

with a motor driven presser to flatten the dough mixture in the pan to the required thickness, with means to reciprocate the presser every time a pan filled with pizza dough mixture passes underneath it;

with a manual control mechanism for the dough transfer and dough depositing mechanism;

and with means to actuate the automatic devices connected to the means which transfer the pizza dough mixture from the charging hopper so that the spice and condiment container and dispenser will not function until they have been loaded.

BRIEF DESCRIPTION OF THE DRAWINGS

FIG. 3 is a schematic layout of the machine of FIGS. 1 and 2, showing also various optional improvements.

DESCRIPTION OF THE PREFERRED EMBODIMENTS

Figure 1:
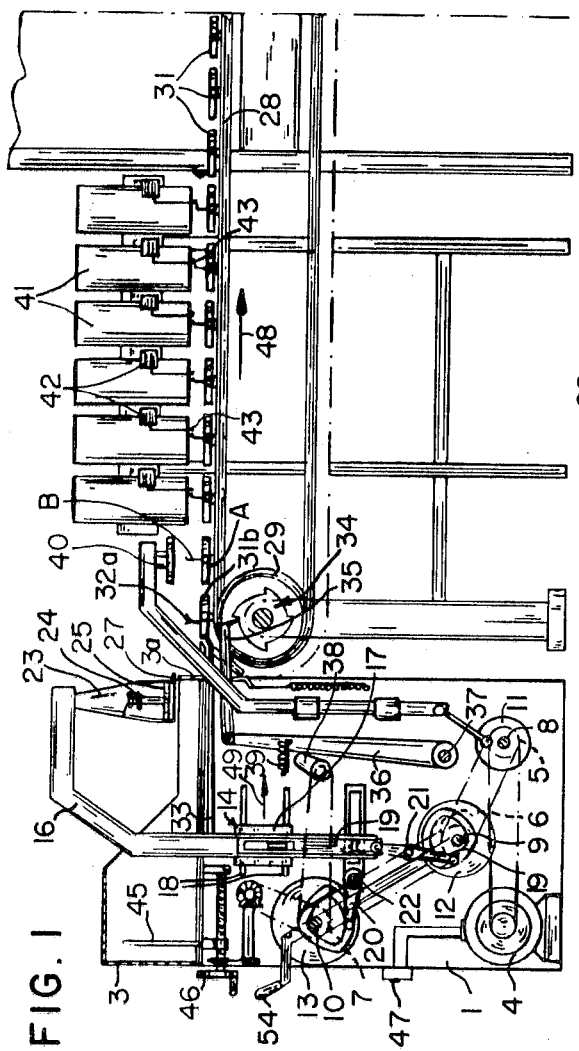
FIG. 1 shows a side view of the automatic pizza making machine.

There are shown in the drawings: a drive means 1, control means 2, a charging hopper 3 and a movable wall 3a. Inside the hopper is mounted a pusher 45 driven by the motor 4 by means of a drive chain transmission and bevel gears 7a. The purpose of the pusher is to constantly press the pizza dough mixture in the hopper against the movable wall 3a. The pusher can be manually released by the lever 46, without interfering with action of the motor and drive chain transmission.

The motor group 2 comprises motors 4, mechanically connected to three chain driven sprocket wheels 5, 6 and 7, splined to the three shafts 8, 9 and 10 supported by base frame 1a. The three sprocket wheels are connected in the chain drive train with a flywheel 11. Two cams 12 and 13 are mounted loosely on shafts 9 and 10 and can be clutchwise engaged with sprocket wheels 6 and 7, by manually operating lever 54.

The mechanism 14 is a means by which a predetermined sufficient quantity of dough mixture for one pizza is taken from the hopper 3 and transferred into a pan 32a on a conveyor belt 28.

The mechanical group 14 comprises a moving arm 16, slidingly mounted in a carriage 17 which provides a vertical movement to the moving arm and which also slides on horizontal guide rails 18 for horizontal movement. The guide rails are mounted to the sides of frame 1a. The moving arm 16 is connected to cam 12 by lever 19 hinged at 21 for horizontal movement and connected to cam 13 by lever 20 hinged at 22 for vertical movement.

A mold 23 is attached to the upper far end of the moving arm 16, being a tubular element with a plunger 25 mounted inside. The plunger is actuated by a compression spring 26 and is free to move vertically. The mold further comprises an aperture plate 27 which also actuates the movable wall 3a of the hopper.

The conveyor belt 28 is mounted on a driving pulley 29 and an idler pulley 30; fixed hingedly to the conveyor belt is a plurality of pans 31, each of intended shape and suitable to receive and contain a predetermined amount of pizza dough mixture deposited into them by the mechanism 14.

The pans 31 are each equipped with a pivot lever 32 which is positioned by a lever 33 attached to the moving arm 16.

The movement of the conveyor 28 is effected by a ratchet wheel 34 coupled with the drive pulley 29, the ratchet which is rotated by a pawl 35 linked to a pivot lever 36, which pivots at pivot pin 37 attached to the frame 1a; the pivot lever 36 is moved forward by a cam 38. The cam is rotated by means of a drive chain and drive sprockets connected to drive shaft 10 which is rotated by means of the motor 4. The pivot lever 36 is returned to its "off" position by retracting spring 39.

The presser unit 40 reciprocates vertically and is operated by the flywheel 11, connected to it by a connecting rod and eccentric pin. The pressure unit presses down upon the pizza dough, which was deposited in the pans 31b to spread out the pizza dough to the correct thickness. Several rows and preferably six rows of containers 41 spaced apart are mounted over the conveyor in correct relation to the pans 31. These containers hold and dispense the various ingredients needed and prescribed to flavor the pizzas. The dispensing means are of a currently used type. Each container is equipped with a motor 42 which drives the dispenser and is actuated by a microlimit switch 43 positioned in line with the row of pans 31. Near the end of the conveyor a heating oven 44 is arranged through which the conveyor and pans 31 filled with pizza dough, spices and condiments will pass to bake the pizza at the correct temperature and length of baking time.

The designed functional mechanical aspects of the machine according to the invention are as follows: The switch 47 actuates the motor 4, which by means of chain drive rotates chain sprockets 5, 6 and 7 rotating cam 38 and setting pusher 45 into motion.

By the same chain drive flywheel 11 rotates, operating the presser unit 40 causing it to alternately move up and down. Simultaneously the cam 38 causes the lever 36 to oscillate, which reciprocates the ratchet pawl 35, moving the ratchet wheel 34, coupled to the drive pulley 29, imparting spaced intermittent movements to the conveyor in the direction of arrow 48. After a number of movements, pan 31b is placed in line with the presser 40, and subsequently in sequential order is moved in line with the spaced containers 41 before being moved in and through the baking oven 44.

In this synchronized mode, if lever 54 is moved, the cams 12 and 13 are coupled to the chain sprockets 6 and 7 and are rotated by them. At this point of synchronization, cam 13 moves lever 20 which moves mechanical unit 14 into a downward motion. As a result, mold 23 dips into the pizza dough in the hopper 3, filling the mold with dough. At the same time, aperture 27 makes contact with movable wall 3a of the hopper moving it downward level with the base of the hopper.

At this time point, as the cam 12 moves lever 19 and therefore carriage 17, with arm 16 in the direction of arrow 49, the mold 23 being attached to lever 19 as a result, leaves the charging hopper 3 and moves toward the conveyor 28 until it is above and in line with the pan 31b. At this same time, the moving wall 3b returns to its previous position. At this same time, the plunger 25 by means of a compression spring 26 performs an expelling action, expelling the pizza dough from the mold 23, depositing it into the pan 31b. Simultaneously, lug 32a on pan 31b is moved by lever 33 from position A to position B. These synchronized movements being completed, the cam 13 causes the moving arm with attached mold 23 to rise, while cam 12 operates lever 19, retracts the moving arm horizontally, the entire mechanical unit 14 then returns to its starting position.

By the action of ratchet wheel 34, the pan 31b is transported to align with the presser 40 which is moved downward by the flywheel 11, is pressing upon the pizza dough mixture in pan 31b to flatten it to the predetermined thickness. The presser then returns to its starting "up" position.

In synchronized intermittent movements effected by the ratchet wheel, the pan 31b is progressively moved to be in alignment with the different spice and condiment containers 41. In each position, a microswitch is tripped by the pivoting lug 32 actuating dispenser motors 42 which dispense the predetermined amount of spice and condiment and which are deposited upon the pizza dough from each respective container 41. The pan 31b simultaneously with pans 31 continues to move forward into the heating oven 44 where the pizza dough, spices and condiments are baked at a predetermined temperature and time period.

The length of the baking period has to be established at the time the machine is designed and built.

Figure 2:
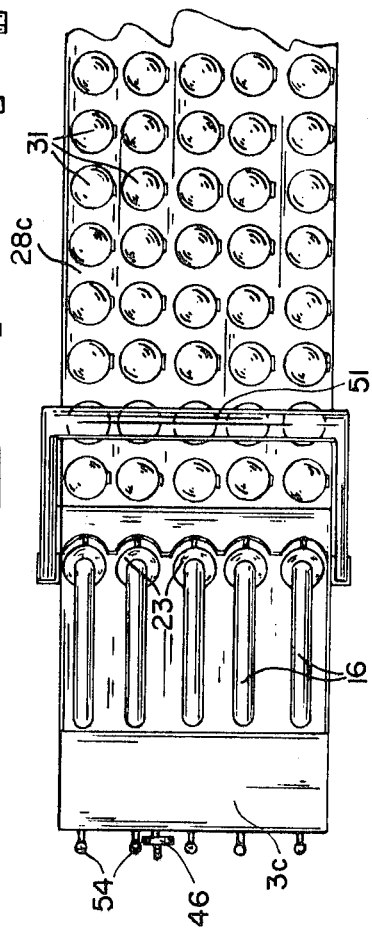
FIG. 2 shows a plan view of the machine of FIG. 1.

After baking, the pizzas leave the oven 44 and are deposited on the platform 50, while the pivoting lug 32 returns to its A position and pan 31b is returned to the conveyor into the starting position. A preferred embodiment of the invention according to FIG. 2, the machine has preferably five processing lines as described. The pressers 40 are mounted on a common frame 51 and operated by one flywheel 11. There is a hopper 3c and one conveyor belt for the five processing lines.

All the mechanical synchronized movements may be driven by a single motor 4.

I claim:

1. An automatic pizza making machine comprising:
    a source of pizza dough;
    at least one processing means;
    means to separate and mold a predetermined quantity of pizza dough required for one pizza into a preform and transfer same, including a preform station;
    a plurality of working stations, including in sequence: a loading station, a pressing station, at least one spices and condiments dispensing station and a baking station;
    an endless conveyor belt with driving means;
    pans spaced and mounted on said conveyor belt;
    means to deposit said preforms on said pans;
    means above said pressing station to press said preforms to a predetermined thickness; and
    at least one source of spices and condiments mounted over said conveyor belt at said at least one spices and condiments dispensing station.

2. An automatic pizza making machine as claimed in claim 1 comprising: a dough forwarding means mounted at the said source of dough; a common single driving means to actuate said dough forwarding means, said preform station, said loading station, said conveyor belt and said pressing station;
    a single control means to start and stop and synchronize said common single driving means, predetermined quantity of dough, said loading station, said conveyor belt with said pans and said pressing station.

3. An automatic pizza making machine as claimed in claim 2 further comprising: a central control means to start and stop said common single driving means.

4. An automatic pizza making machine as claimed in claim 3, said pans, each provided with a tripping lever, said spices and condiments dispensing station further comprising: an electric motor with a dispenser means and an associate circuit actuated by a tripping switch tripped by said tripping levers on said pans.

5. An automatic pizza making machine as claimed in claim 4 further comprising:
    means to program said means to actuate said dispensing means and
    means to stop said conveyor belt when said dispensing means is not dispensing.

6. An automatic pizza making machine comprising:
    a motor connected with said motor control unit;
    a dough charging hopper;
    at least one unit of processing means, said unit comprising in sequence:
    a pizza dough releasing means;
    a dough transferring means;
    a conveyor belt drivingly connected with said motor;
    at least one pizza dough receiving means on said conveyor belt;
    at least one electronically actuated container-dispenser of said spices and condiments positioned above said conveyor belt;
    a baking oven with means for said conveyor belt to pass therethrough.

7. An automatic pizza making machine as claimed in claim 6, said at least one unit being a plurality of units spaced from each other in parallel, the said motor, said oven, said common single driving means, said means to program and said central control means being common to said plurality of units.

8. An automatic pizza making machine as in claim 7, further comprising
means to transfer a pizza dough from said source of dough onto said belt, and
a means to stop said means to transfer.

9. An automatic pizza making machine as claimed in claim 8, further comprising automatic means to prevent the said dispenser container from dispensing spices and condiments when said dispenser container is not properly filled.

10. An automatic pizza making machine as claimed in claim 1, further comprising means to return excess dough to said source of dough.

* * * * *